United States Patent Office 2,760,334
Patented Aug. 28, 1956

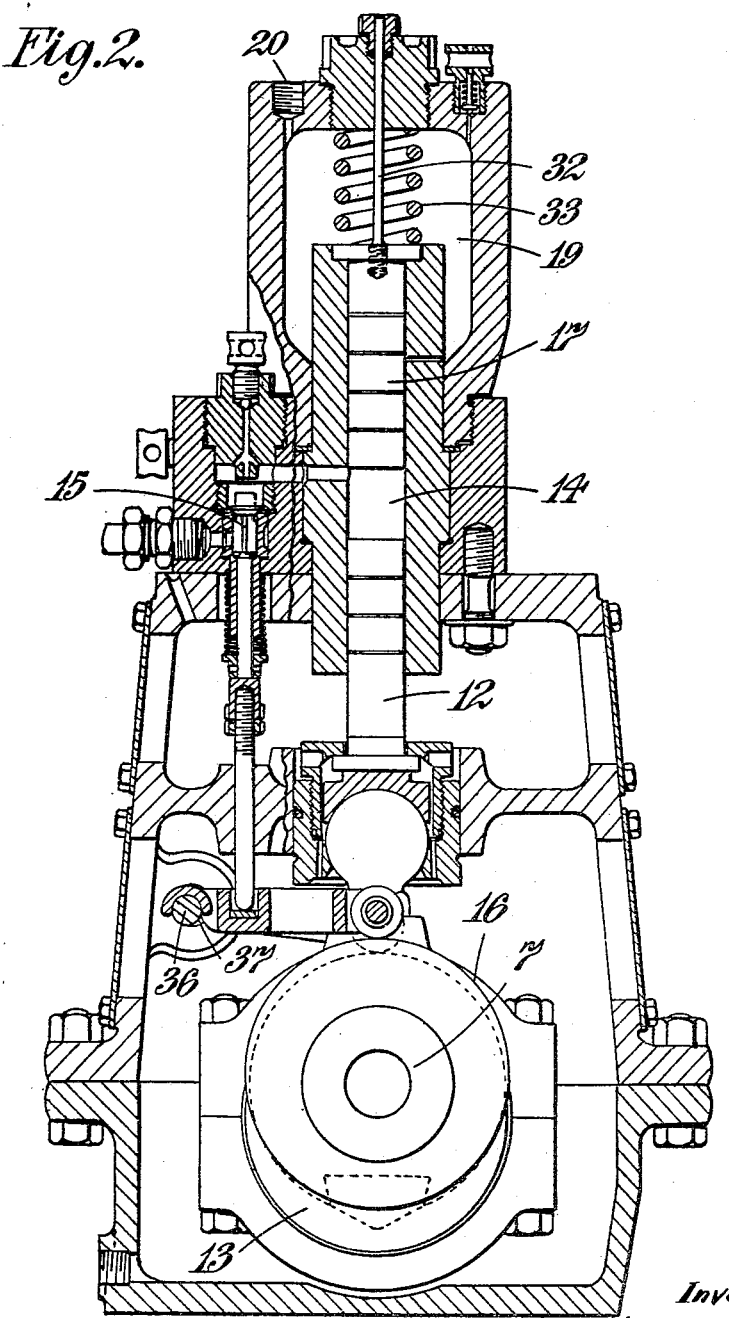

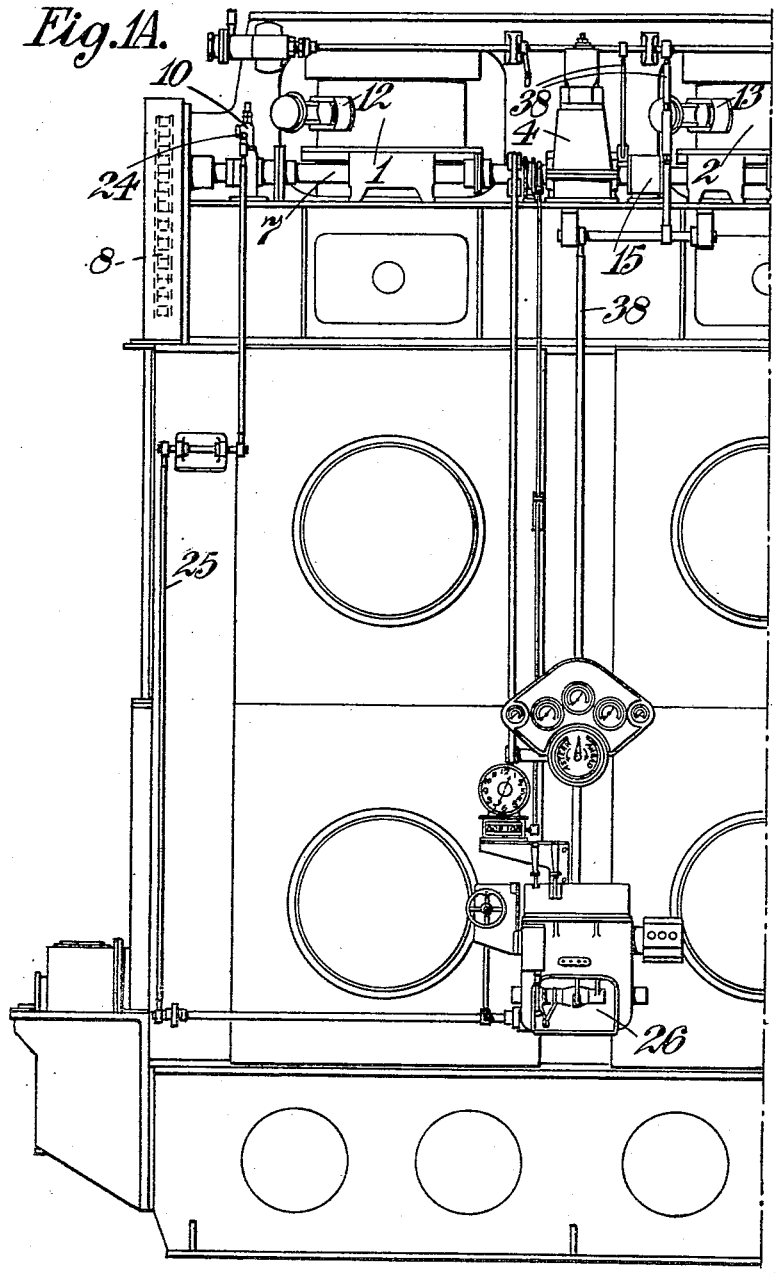

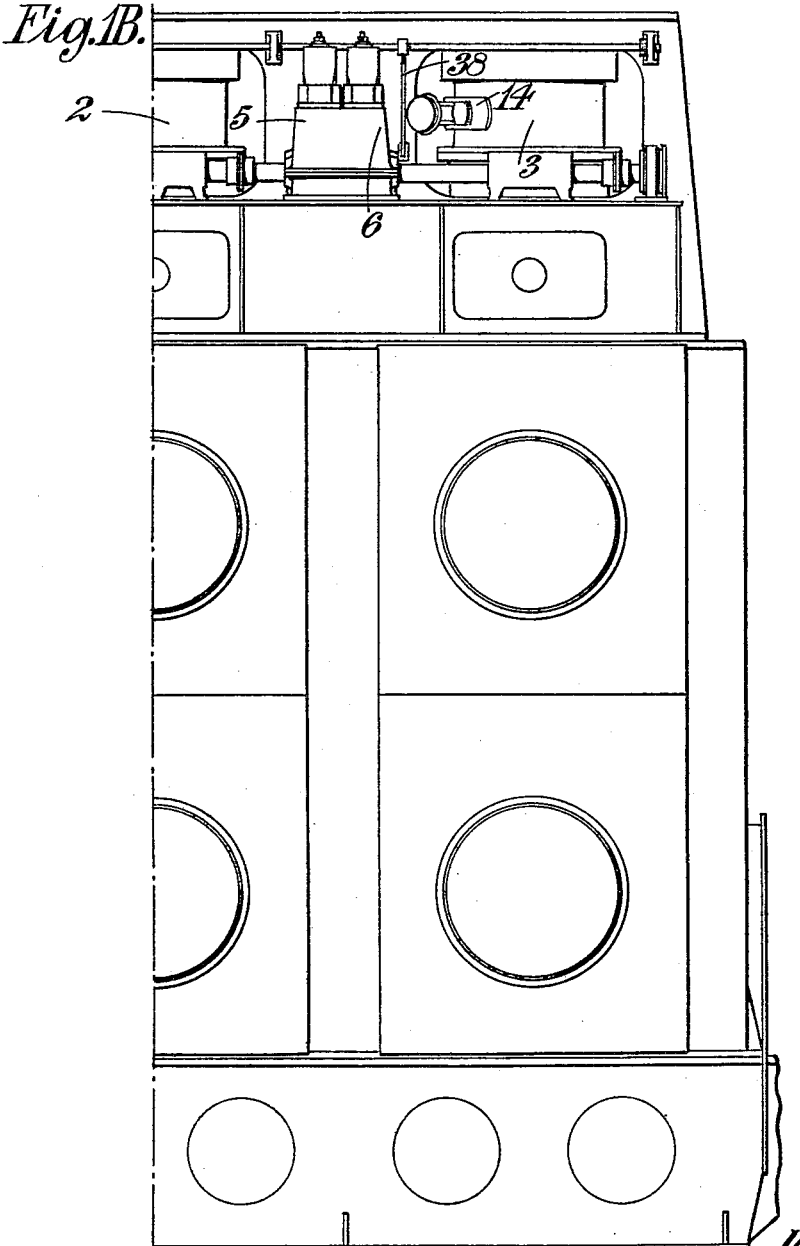

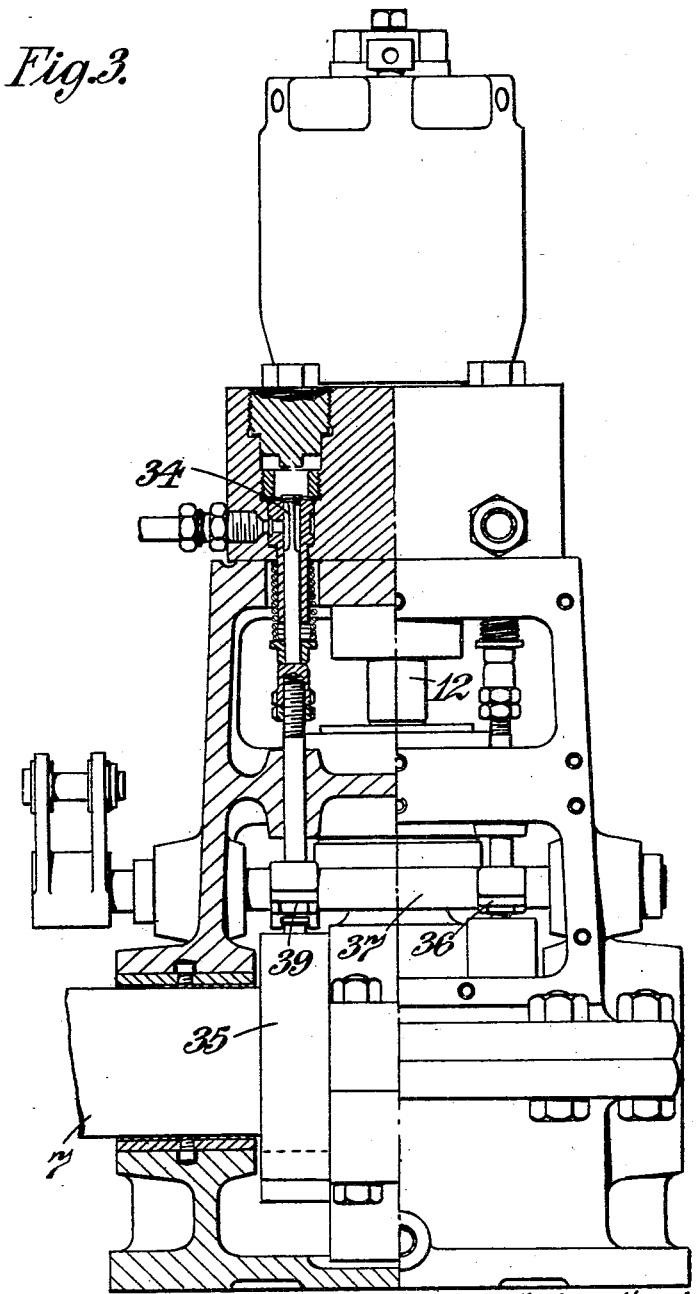

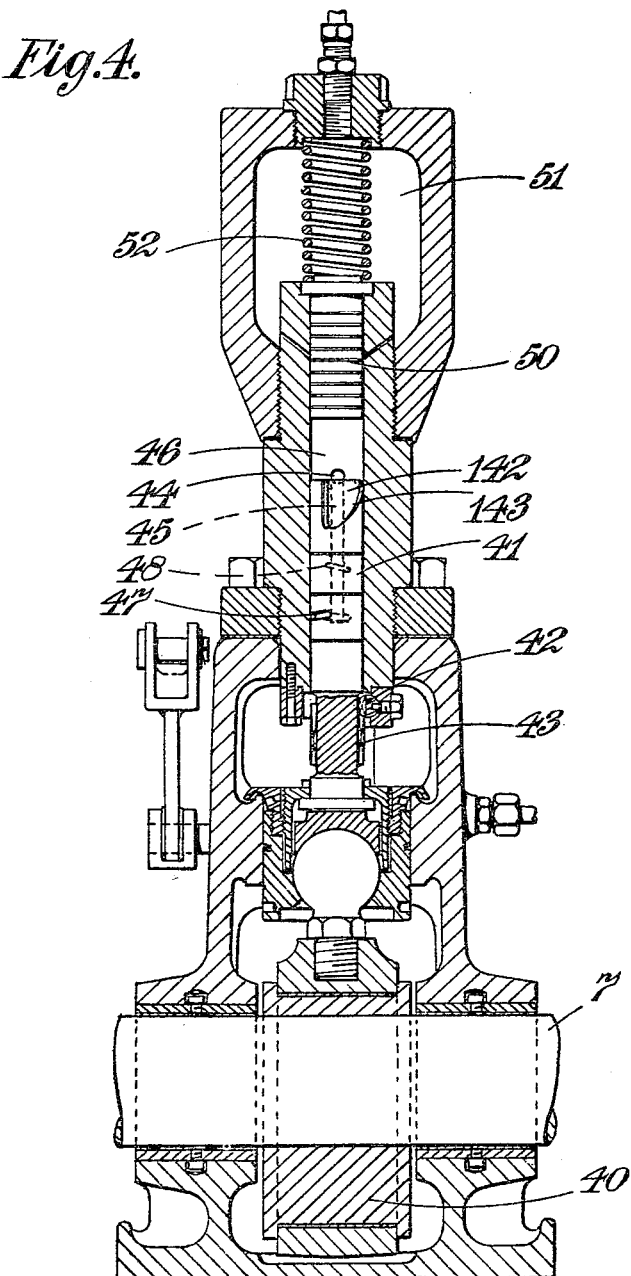

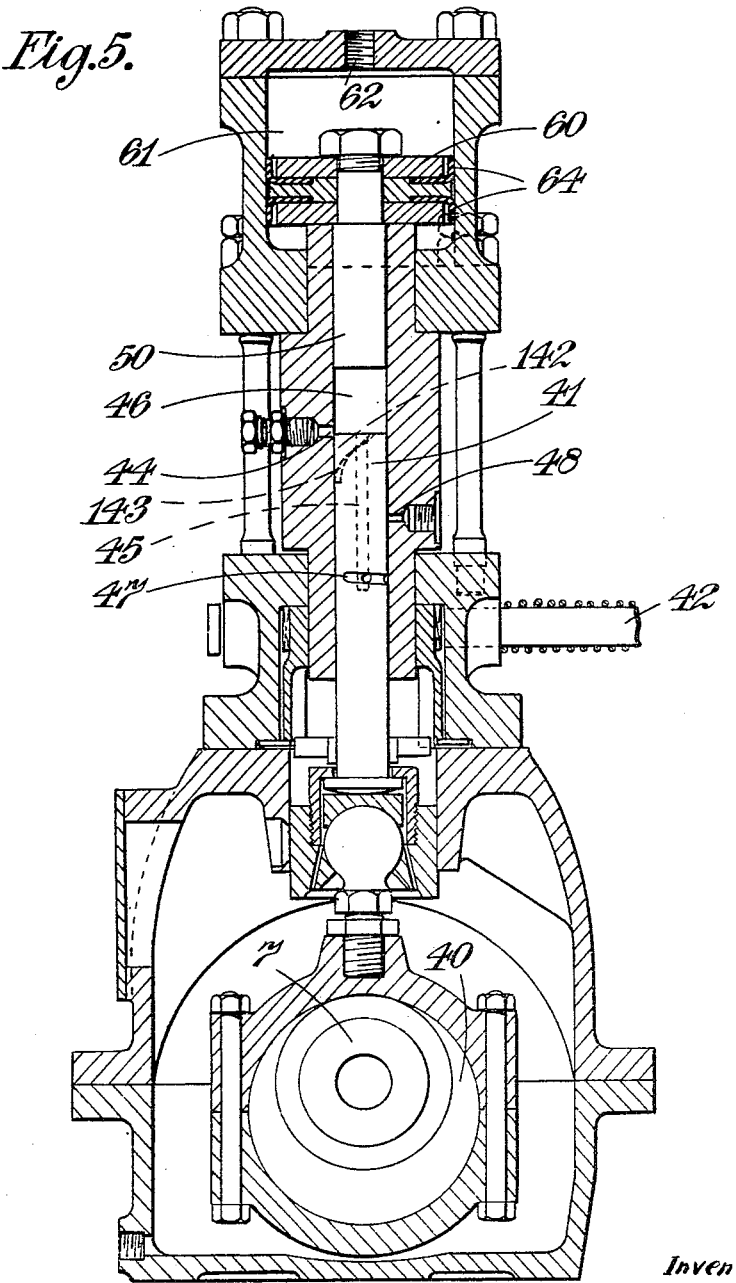

2,760,334

FUEL INJECTION SYSTEMS FOR INTERNAL-COMBUSTION ENGINES

William Hamilton Purdie and Percy Jackson, Sunderland, England, assignors to William Doxford and Sons Limited, Sunderland, England, a British company Application March 3, 1952, Serial No. 274,602

Claims priority, application Great Britain March 5, 1951

6 Claims. (Cl. 60—16)

The invention relates to large air-less injection internal combustion engines operating on the diesel or semi-diesel cycles and is concerned with such engines of the two cycle multi-cylinder marine reversing type having an engine-driven cam-shaft for operating starting air valves and usually other devices such as lubricators and also having one or more engine-driven fuel injection pumps for each cylinder.

For various reasons it is convenient, in engines of the above type, to employ the cam-shaft to drive the fuel pumps. Thus, it is desirable that the fuel pumps be positioned adjacent to the engine cylinders to reduce the length of the connecting pipe lines and the cam-shaft is usually suitably located for driving pumps so positioned. Further, if the cam-shaft is used to drive the pumps the need to provide an additional drive from the engine crank-shaft is avoided.

Fuel pumps such as are usually employed in engines of the above type (i. e. jerk pumps) deliver fuel at full load through a maximum of about 20-24° of crank angle and the rate of doing work is so high that a heavy driving shaft and a heavy drive thereto are required. Such a shaft and drive are not practically satisfactory for operating the cams and it is now customary to locate the fuel pumps low-down adjacent to the crankshaft with a separate short, sturdy drive thereto.

The present invention provides a two-stroke cycle, multi-cylinder, marine, reversing diesel engine having an engine-driven cam-shaft for operating starting air valves and also having one or more engine-driven reciprocatory fuel injection pumps for each cylinder characterised by the features that the fuel pumps are of the accumulator type and are operated by cams, eccentrics or other means from the engine cam-shaft.

The expression "accumulator pump" is used herein to mean a pump or pump installation in which the pump output or a part of it is stored under pressure during the pump stroke and the storage pressure is employed to inject the stored fuel into the engine cylinder. The working stroke of such a pump may extend over, say, 120° of crank angle, so that the rate of work required is very much less than is needed for a jerk pump and the requirement for an excessively sturdy cam-shaft to drive it is avoided.

The pump valves may also be operated from the cam shaft.

In one form of the invention each pump has inlet and discharge valves constituted by ports in the cylinder wall covered and uncovered at appropriate times in the pump cycle by the pump piston.

A further disadvantage of engines of the above type as at present constructed is that heavy reversing mechanism is required for the jerk pumps. This disadvantage is avoided in a preferred form of the invention in which a symmetrical arrangement of driving means for the pumps and their valves is employed.

Some specific constructions of engines according to the invention will now be described by way of example, and with reference to the accompanying drawings in which:

Figures 1A and 1B show a front elevation of a marine engine,

Figure 2 shows a section through a combined fuel pump and accumulator used in the engine shown in Figure 1, Figure 3 is a rear view, partly in section, of the pump shown in Figure 2, Figure 4 shows a section through a second form of fuel pump and accumulator, and Figure 5 shows a section, in a different plane from that of Figure 4, through a further form of fuel pump and accumulator.

The engine forming the subject of the first example is shown in Figures 1 to 3. The engine is a three-cylinder, opposed piston, reversing marine engine operating on the full diesel cycle, with air-less injection. Each of the cylinders 1, 2, 3 has a combined pump and accumulator shown at 4, 5 and 6. The three pumps are driven from a common camshaft 7 driven by a chain 8 from the engine crankshaft. All the accumulator chambers of the pumps are interconnected by a pipe (not shown) and they are all connected to a single charging pump 10 also driven from the shaft 7 and arranged to maintain pressure in the accumulator chambers of the pumps. If desired a second charging pump may be provided and the two pumps may be used simultaneously or alternatively.

The cam-shaft 7 also operates, in well-known manner, valves for submitting starting air to the cylinders and mechanical lubricators for the engine parts.

All three accumulator pumps are alike in construction and operation and only one will be described in detail. The pump is shown in Figures 2 and 3 and has a plunger 12 operated by an eccentric 13 on the cam-shaft 7 of the engine and the measured quantity of fuel to be injected is trapped in the space 14 during upward movement of the plunger and when the suction valve 15 has been permitted to seat by the cam 16 and thus to prevent escape of fuel from the space. Above the space 14 there is a free plunger 17 of which the lower end is subjected to the pressure of the fuel in the space 14 and the upper end is subjected to the pressure of oil in an accumulator chamber 19. This chamber is, as stated already, connected to the charging pump 10, the inlet to the chamber being at 20.

The charging pump 10 is driven by a cam on the shaft 7. The pump delivers oil into the chamber 19 to maintain the pressure in the chamber. The pressure may be varied by varying the output of the pump.

The lift of the free plunger 17 will vary according to the amount of fuel injected (i. e. according to the load on the engine) and a tell-tale plunger 32 is provided, in this example, at the upper end of the plunger 17 to indicate the travel of the plunger 17 and thereby to show that this is correct according to the load and to indicate that all the plungers are rising by equal amounts.

A spring 33 is provided in the accumulator chamber 19 engaging with the plunger 17 to augment the action of the pressure in the chamber and to ensure that there is a minimum injection pressure should there be a failure in the delivery of the pump 10.

In the operation of the engine the plunger 12 traps in the space 14 a quantity of fuel determined by the position in the stroke of the plunger at which valve 15 is allowed to seat. The pressure of the fuel in the space 14 is equal to that of the oil in the chamber 19 plus the pressure due to the spring 33. When the delivery valve 34 of the pump is opened by cam 35 on shaft 7, the plunger 17 falls rapidly under the action of the pressure in the chamber 19 and the spring and the fuel in the space 14 is injected into the engine cylinder.

The position in the upward stroke of the plunger 12 at which the suction valve 15 is allowed to seat and, consequently, the amount of fuel delivered by each stroke, is variable by rotation of an eccentric 36 on a shaft 37 rotatable from the engine control gear 26 by linkwork 38. The timing of the opening of the discharge valve 34 is simultaneously variable, in like manner, by means of an eccentric 39 on the shaft 37.

The pump plunger moves upwardly on its pumping stroke over 180° of the cam-shaft rotation. The portion of the stroke which is actually employed in pumping (i. e. the portion during which substantial driving torque is required) varies according to the position in the stroke at which valve 15 is allowed to seat. This portion at full load normally however takes about 120° of the cam-shaft rotation, which is much greater than that taken by a jerk-type pump. Consequently the maximum torque required is much reduced and a cam-shaft of practically satisfactory dimensions may be used.

Figure 4 shows another construction of fuel pump which may be used in place of that shown in Figures 2 and 3 and which, in view of its simplicity, is to be preferred for many applications. The pump is, as in the previous example, driven from the shaft 7 by an eccentric 40 which reciprocates the pump plunger 41. This plunger is also rotatable by means of a rack 42 engaging with pinion teeth 43 on the plunger, the rack being reciprocatable by suitable link means from the engine control gear 26. The plunger 41 is formed, at its upper end, with a recess 142 bounded on one side by a helical step 143. This step co-operates with a port 44 in the cylinder wall leading back to the fuel supply, to close the port at a position in the stroke of the plunger 41 depending upon the rotational position of the plunger. Hence the amount of fuel trapped in the space 46 and pumped may be varied. The plunger also has a central passageway 45 leading to a circumferential groove 47 which registers with a discharge port 48 at the upper limit of movement of the plunger.

Opposed to the plunger 41 there is a free plunger 50 which is urged downwardly, as in the previous example, by hydraulic pressure in a chamber 51 and by a spring 52.

In the operation of the pump, fuel is drawn into the pump cylinder during the downward stroke of plunger 41 and during the first part of the upward movement a portion of this fuel (the amount depending upon the rotational position of the plunger) is returned to the supply through port 44. The remainder of the fuel is trapped in space 46 and further movement of the plunger 41 causes plunger 50 to be raised. When groove 47 registers with port 48 the plunger 50 rapidly descends and forces the trapped fuel through the discharge port 48 to the injection nozzle.

Figure 5 shows a modification of the pump shown in Figure 4. The arrangement of the pump plunger 41, the driving means and the co-operating ports in the cylinder wall is substantially as described with reference to Figure 4 and similar reference numerals have been applied to the corresponding parts in both figures.

In this modification the upper end of the upper plunger 50 is provided with an enlarged head 60 which operates, as a piston, in a chamber 61. Air or other gas is maintained in the chamber 61 above the piston under pressure (say 600 lbs. per square inch). The ratio between the area of the piston 60 and the area of the plunger 50 determines the injection pressure of the fuel on the underside of the plunger 50. The pressure in the chamber may be obtained from any convenient source such as the starting air storage bottles of the engine, or from an auxiliary air compressor driven by the engine or other means or the gas may be bled off from the engine cylinder in each case the gas being fed to the chamber through the opening 62. The pressure in the accumulated chamber may be regulated by a reducing valve or a stop valve. The piston 60 may be sealed by leather cup washers 64 as shown or by piston rings. With this example the pump 10 may be omitted.

In each of the above examples the eccentric which operates the pump and the eccentric or cams, when provided, which operate the valves, are all symmetrical. That is to say, the pumps will operate with the same timing with respect to the engine pistons for each direction of rotation, consequently the need for reversing mechanism to operate the pump is avoided. The timing of the pumps is such that the injection of the fuel begins at, or immediately before, the end of the engine compression stroke and the pump piston reaches the end of its upward stroke to coincide with the end of the engine compression stroke. The end of injection is determined by the exhaustion of the accumulated fuel and is independent of the closing of the pump discharge valve which occurs later.

We claim:

1. In a two-stroke cycle multi-cylinder marine reversing diesel engine of the type having an engine-driven cam shaft arranged adjacent the cylinders of the engine and provided with cams for operating air-starting valves, the improvement comprising at least one accumulator type pump for each cylinder adapted to supply fuel thereto and cam means on the cam shaft operating said accumulator pumps in synchronism with the engine.

2. In a two-stroke cycle multi-cylinder marine reversing diesel engine of the type having a crankshaft, upright cylinders arranged in line along the crankshaft, an engine-driven cam shaft arranged adjacent the cylinders and parallel to the engine crankshaft and provided with cams for operating air-starting valves, the improvement comprising at least one fuel injection pump of the accumulator type for each cylinder adapted to supply fuel thereto and cam means on the cam shaft operating said accumulator pump in synchronism with the engine.

3. In a two-stroke cycle multi-cylinder marine reversing diesel engine of the type having an engine-driven cam shaft arranged adjacent the cylinders of the engine and provided with cams for operating air-starting valves, the improvement comprising at least one accumulator type pump for each cylinder adapted to supply fuel thereto under pressure and cam means on the cam shaft operating said accumulator pump in synchronism with the engine, said cams being formed so as to cause the pumps to carry a working load over approximately 120° of cam shaft angle.

4. In a two-stroke cycle multi-cylinder marine reversing diesel engine of the type having an engine-driven cam shaft arranged adjacent the cylinders of the engine and provided with cams for operating air-starting valves, the improvement comprising at least one fuel injection pump of the accumulator type for each cylinder adapted to supply fuel thereto, inlet and discharge valves on said pump and cam means operating said pump and inlet and discharge valves in synchronism with the engine.

5. In a two-stroke cycle multi-cylinder marine reversing diesel engine of the type having an engine-driven cam shaft arranged adjacent the cylinders of the engine and provided with cams for operating air-starting valves, the improvement comprising at least one fuel injection pump of the accumulator type having a pump piston in a pump cylinder with inlet and discharge ports in the pump cylinder, the ports being covered and uncovered in the pump cycle, by the pump piston in synchronism with the engine cylinders and cams on the cam shaft operating said pump piston in synchronism with the engine cylinders.

6. In a two-stroke cycle multi-cylinder marine reversing diesel engine of the type having an engine-driven cam shaft arranged adjacent the cylinders of the engine and provided with cams for operating air-starting valves, the improvement comprising at least one reciprocating fuel injection pump, comprising a pump chamber having inlet and outlet ports, a free plunger in one end of said chamber, resilient means urging said free plunger into said chamber and a pump plunger in the other end of said chamber, said ports being arranged so that the inlet port is covered by the pump plunger in the latter part of its inward pumping stroke whereby fuel trapped between the two plungers is accumulated during the remainder of the pumping stroke under pressure from the free plunger and the outlet port being uncovered by the pump plunger at the end of the pumping stroke whereby the accumulated fuel is then forced out of the chamber under pressure through the outlet port, and cam means on said shaft for operating said pump plunger.

References Cited in the file of this patent

UNITED STATES PATENTS

| | | |
|---|---|---|
| 1,298,455 | Carter | Mar. 25, 1919 |
| 1,837,171 | Petersen | Dec. 15, 1931 |
| 1,897,044 | Elwell | Feb. 14, 1933 |
| 1,919,601 | Simmen | July 25, 1933 |
| 1,989,891 | Sprado | Feb. 5, 1935 |
| 2,225,019 | Retel | Dec. 17, 1940 |

FOREIGN PATENTS

| | | |
|---|---|---|
| 158,032 | Switzerland | Jan. 2, 1933 |
| 399,265 | Great Britain | Oct. 5, 1933 |
| 762,737 | France | Jan. 29, 1934 |